(12) United States Patent
Epshetsky et al.

(10) Patent No.: US 8,960,680 B2
(45) Date of Patent: Feb. 24, 2015

(54) STATIC-DYNAMIC SEAL ASSEMBLY WITH HYSTERESIS-INDUCING PASSAGES

(75) Inventors: Yefim A. Epshetsky, Schaumburg, IL (US); Mathew Peter Rosauer, Algonquin, IL (US)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/995,874

(22) PCT Filed: Dec. 19, 2011

(86) PCT No.: PCT/US2011/065867
§ 371 (c)(1),
(2), (4) Date: Sep. 9, 2013

(87) PCT Pub. No.: WO2012/087945
PCT Pub. Date: Jun. 28, 2012

(65) Prior Publication Data
US 2014/0001707 A1    Jan. 2, 2014

Related U.S. Application Data

(60) Provisional application No. 61/425,149, filed on Dec. 20, 2010.

(51) Int. Cl.
*F16J 15/16*     (2006.01)
*F16J 15/42*     (2006.01)
*F16J 15/44*     (2006.01)
(52) U.S. Cl.
CPC ............... *F16J 15/164* (2013.01); *F16J 15/44* (2013.01)
USPC ............ 277/433; 277/305; 277/423; 277/425

(58) Field of Classification Search
CPC ....... F16J 15/22; F16J 15/4472; F16J 15/164; F16J 15/42; F16J 15/441; B61F 15/22
USPC ................... 277/423–425, 433, 305, 422, 580
See application file for complete search history.

(56) References Cited

U.S. PATENT DOCUMENTS

2006/0091612 A1*   5/2006   Anderberg .................... 277/411

* cited by examiner

*Primary Examiner* — Gilbert Lee
(74) *Attorney, Agent, or Firm* — Mark Ussai; SKF USA Inc. Patent Depart.

(57) ABSTRACT

A seal assembly is for sealing a clearance space about a shaft, the shaft being rotatable about a central axis, and includes a generally annular sealing member disposed about the shaft. The sealing member is radially deflectable between an inner position and an outer position, the sealing member sealing the clearance space when located at the inner position. A generally annular rotor is disposed about and rotatably coupled with the shaft, the rotor having a generally annular cavity sized to receive the sealing member and at least one and preferably a plurality of lift passages extending at least partially radially through the rotor. Each lift passage has an inner port fluidly coupled with the cavity and an outer port fluidly coupled with an exterior atmosphere such that suction generated within the lift passages when the rotor angularly displaces about the axis generally retains the sealing member at the outer position.

10 Claims, 5 Drawing Sheets

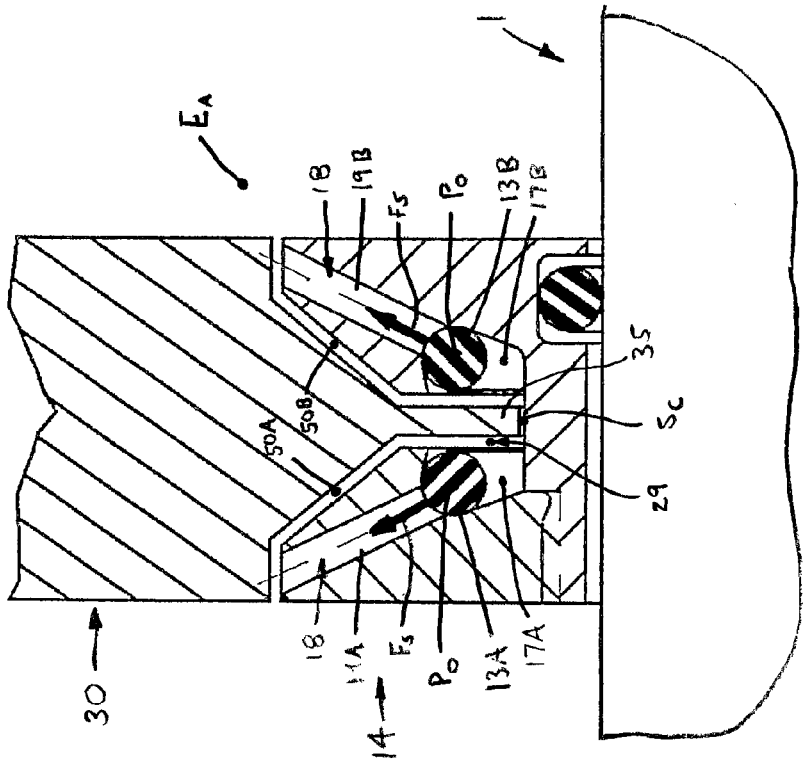
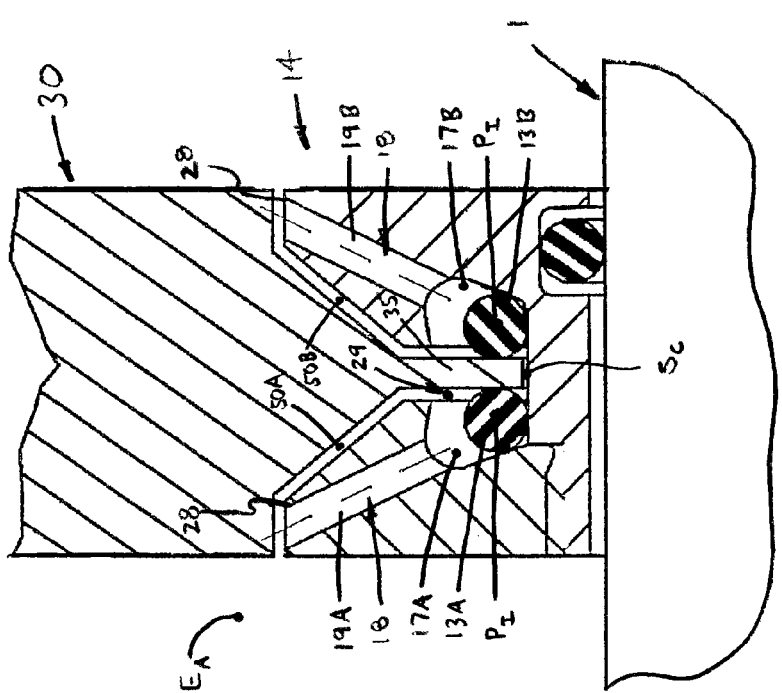

STATIC-DYNAMIC SEAL ASSEMBLY WITH HYSTERESIS-INDUCING PASSAGES

The present invention relates to seal assemblies, and more specifically to seal assemblies with sealing members movable between static and dynamic sealing positions.

Seal assemblies having one or more sealing members that move between static and dynamic sealing positions are known. One such type of seal assembly, commonly referred to as an "expeller" seal assembly, includes two annular, elastomeric sealing members (e.g., O-rings) disposed within separate annular cavities of a rotor mounted on a shaft. A stator is partially disposed between the two rotor cavities and has a central bore which defines a clearance space about the shaft. At a static sealing position, each sealing member is disposed generally against a rotor outer circumferential surface and against an adjacent radial surface on each axial end of the stator, such that the clearance space is substantially sealed at each end.

When the shaft rotates, the two sealing members are pulled by frictional engagement with the rotor surface to rotate with the shaft, until centrifugal forces cause each sealing member to deflect radially outwardly from the rotor outer surface and from the stator surface. At this point, sealing in the clearance space is accomplished by a pressure differential generated by the rotation of the rotor, and the disengagement of the seal from the stator both reduces wear on the sealing members and reduces friction in the seal assembly. However, until the rotor and sealing members reach a rotational speed sufficient to deflect the sealing members into contact with an inner circumferential surface of the rotor, such that the sealing members are again rotationally coupled with the rotor, the sealing members will lose angular momentum and deflect inwardly due to the diminished centrifugal force and return to the inner, static sealing position.

Thus, the sealing members will oscillate between the inner, static sealing position and a non-contact position until reaching a sufficient "hold-off" speed at which the sealing members remain rotationally coupled with the rotor. Also, whenever the shaft speed decreases below the hold-off speed, the sealing members will again begin to oscillate into and out of contact with the stator. As such, this oscillatory motion of the sealing members tends to increase wear and increase friction within the seal assembly.

SUMMARY OF THE INVENTION

In one aspect, the present invention is a seal assembly for sealing a clearance space about a shaft, the shaft being rotatable about a central axis. The seal assembly comprises a generally annular sealing member disposed about the shaft, the sealing member being radially deflectable between an inner position and an outer position, the sealing member sealing the clearance space when located at the inner position. A generally annular rotor is disposed about and rotatably coupled with the shaft, the rotor having a generally annular cavity sized to receive the sealing member and at least one lift passage extending at least partially radially through the rotor. The lift passage has an inner port fluidly coupled with the cavity and an outer port fluidly coupled with atmosphere such that suction generated within the lift passage when the rotor angularly displaces about the axis generally retains the sealing member at the outer position.

In another aspect, the present invention is again a seal assembly for sealing an opening about a shaft, the shaft being rotatable about a central axis. The seal assembly comprises a generally annular sealing member disposed about the shaft, the sealing member being radially deflectable between an inner position and an outer position, the sealing member sealing at least a portion of the opening when located at the inner position. A generally annular rotor is disposed about and rotatably coupled with the shaft, the rotor having a generally annular cavity sized to receive the sealing member and a plurality of lift passages spaced circumferentially about the axis. Each lift passage extends at least partially radially through the rotor and has an inner port fluidly coupled with the cavity and an outer port fluidly coupled with an exterior atmosphere such that a pressure differential between the inner and outer ports arises when the rotor angularly displaces about the axis. The sealing member is disposed within the cavity and the pressure differential within each lift passage generates suction on the sealing member so as to retain the member generally at the outer position.

In a further aspect, the present invention is once again a seal assembly for sealing an opening about a shaft, the shaft being rotatable about a central axis. The seal assembly comprises a stator disposed about the shaft, having opposing radial surfaces and an inner circumferential surface at least partially defining the opening. First and second generally annular sealing members are each disposed about the shaft so as to rotate about the axis as the shaft rotates, each sealing member being radially deflectable between an inner position at which the sealing member is disposed against a separate one of the stator radial surfaces, and a radially outer position. Further, a generally annular rotor is disposed about and rotatably coupled with the shaft, the rotor having first and second generally annular cavities each sized to receive one of the sealing members, a central opening sized to receive at least a portion of the stator, and at least two lift passages each extending at least partially radially through the rotor. Each lift passage has an inner port fluidly coupled with a separate one of the first and second cavities and an outer port fluidly coupled with an exterior atmosphere such that suction generated within the lift passages when the rotor angularly displaces about the axis generally retains each of the first and second sealing members at the member outer position.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 3A and 3B, collectively FIG. 3, are each an axial cross-sectional view of the seal assembly, FIG. 3A showing a sealing member in an inner position and FIG. 3B showing the sealing member in an outer position;

FIG. 4, are each a radial cross-sectional view of the seal assembly, FIG. 4A showing the sealing member in the inner position and FIG. 4B showing the sealing in the outer position.

DETAILED DESCRIPTION OF THE INVENTION

Figure 1:
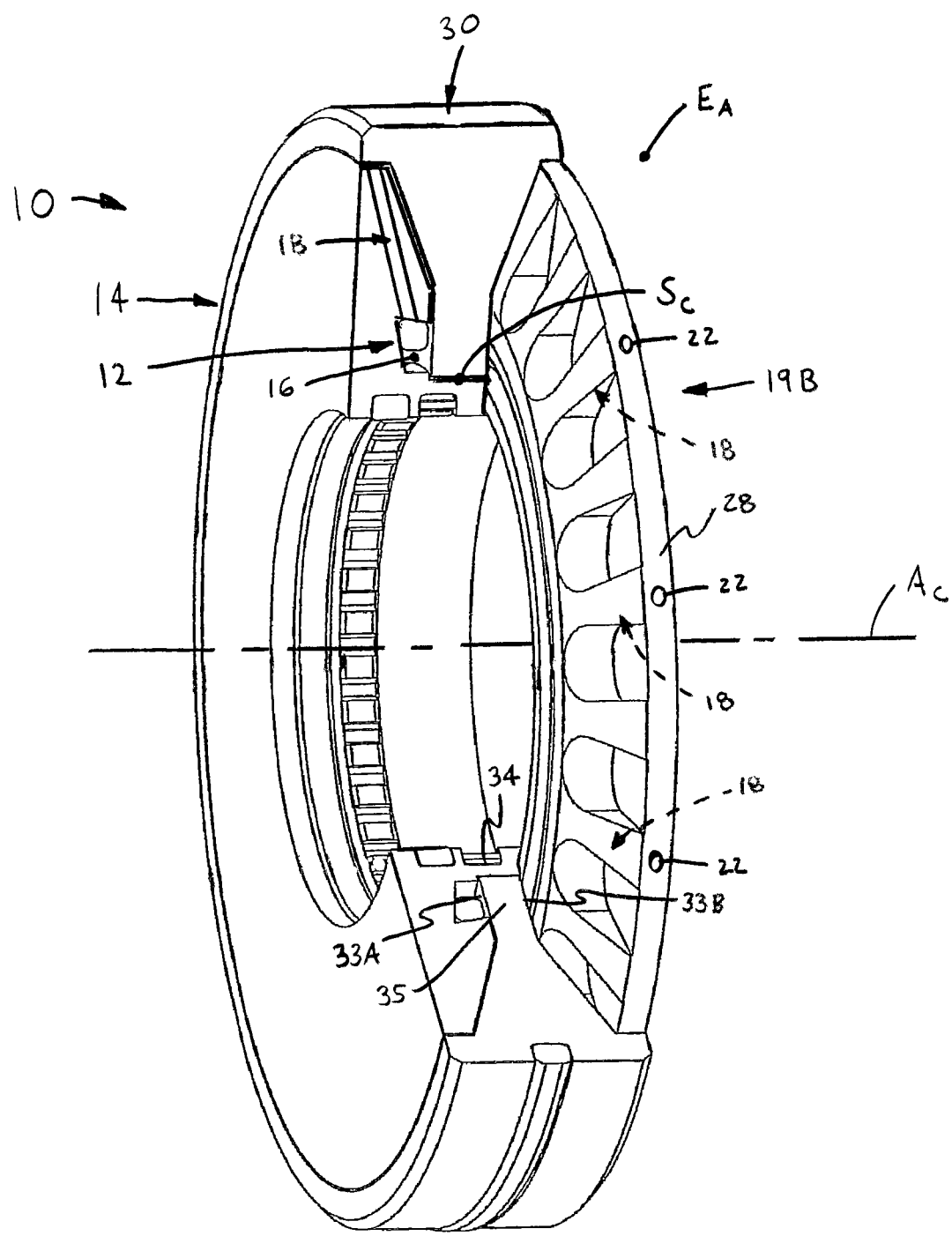
FIG. 1 is a partly broken-away, perspective view of a presently preferred embodiment of a seal assembly in accordance with the present invention.

Certain terminology is used in the following description for convenience only and is not limiting. The words "right", left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import. Also, descriptions herein to different positions $P_I$, $P_O$ of a sealing member 12 are made with reference in the drawings to discrete points on the member 12, these exact points on the member 12 having been randomly selected for convenience of illustration only and have no particular relevance.

Referring now to the drawings in detail, wherein like numbers are used to indicate like elements throughout, there is shown in FIGS. 1-5 a seal assembly 10 for sealing a clearance space $S_C$ about a shaft 1, the shaft 1 being rotatable about a central axis $A_C$. The seal assembly 10 basically comprises a generally annular sealing member 12 disposed about the shaft 1 and a generally annular rotor 14 disposed about and rotatably coupled with the shaft 1, the rotor 14 having a generally annular cavity 16 sized to receive the sealing member 12. The sealing member 12 is disposed within the cavity 16 and is radially deflectable between an inner position $P_I$ (FIGS. 2, 3A and 4A) and an outer position $P_O$ (FIGS. 3B and 4B). The sealing member 12 seals or obstructs at least a portion of the clearance space $S_C$ when located at the inner position $P_I$ so as to prevent the passage of substances therethrough. Further, the rotor 14 has at least one, and preferably a plurality of lift passages 18 each extending at least partially radially outwardly through the rotor 14. Each lift passage 18 has an inner port 20 fluidly coupled with the cavity 16 and an outer port 22 fluidly coupled with the exterior atmosphere $E_A$, i.e., the space outside of/external to the seal assembly 10. As such, a pressure differential between the inner and outer ports 20, 22 arises when the rotor 14 angularly displaces about the axis $A_C$, the pressure differential generating suction $F_S$ on the sealing member 12 so as to retain the member 12 generally at the outer position $P_O$. That is, during rotation of the rotor 14, the combination of centrifugal force pushing air or any other fluids within the cavity 16 into the inner port 20 and outwardly through the passage(s) 18, as well as the relatively higher velocity ambient air (i.e., due to relative rotor velocity) pulling or drawing fluids from the passage(s) 18 at the outer port 22, creates a vacuum-like condition within the passages 18 that generates suction on the sealing member 12.

More specifically, the sealing member 12 is coupleable with the shaft 1 such that the rotation of the shaft 1 angularly displaces the sealing member 12 about the central axis $A_C$. Preferably, the sealing member 12 is indirectly coupled with the shaft 1 through the rotor 14, which is directly mounted on the shaft 1, and the sealing member 12 is frictionally engageable with an outer circumferential surface 24 of the rotor 14, which partially bounds the cavity 16 as described below. As such, the sealing member 12 is "pulled" by the rotor 14 to angularly displace along with the rotor 14 during shaft rotation. However, the sealing member 12 may alternatively be directly engaged with the shaft outer surface 1a or indirectly coupled with the shaft 1 in any other appropriate manner (e.g., through a sleeve, none shown).

In any case, the sealing member 12 is configured to deflect radially outwardly from the inner position $P_I$ toward the outer position $P_O$ by centrifugal force when the sealing member 12 displaces about the axis $A_C$ above a particular rotational speed, which depends on the size and specific material of the member 12. Preferably, the sealing member 12 is formed of an elastomeric material, and most preferably formed as a conventional "O-ring", such that centrifugal force causes the sealing member 12 to stretch relatively uniformly radially outwardly to the outer position $P_O$. However, the sealing member 12 but may be formed of any other appropriate material capable of deflecting radially outwardly by centrifugal force, e.g., as a metallic spring covered by a "stretchable" fabric (not shown).

Further, after deflecting to the outer position $P_O$, the suction $F_S$ generated by the at least one lift passage 18 generally retains the sealing member 12 at about the outer position $P_O$ when the shaft 1 angularly displaces relative to the sealing member 12. That is, when the sealing member 12 deflects from the inner position $P_I$, the sealing member 12 becomes uncoupled from the rotor 14, and thus from the shaft 1, such that the rotating shaft 1 (and rotor 14) displaces angularly relative to the sealing member 12, at least to a certain extent, even though the sealing member 12 does continue to angularly displace about the axis $A_C$. As discussed in the background section of this disclosure, the sealing member 12 typically loses angular momentum, and would normally deflect radially inwardly toward the rotor surface 24 as centrifugal force on the sealing member 12 decreases. However, due to the suction $F_S$ generated by the lift passage(s) 18, the sealing member 12 is instead biased radially outwardly so as to be retained generally at the outer position $P_O$. Additionally, besides retaining the sealing member 12 at the outer position $P_O$, the suction $F_S$ generated by the rotating lift passage(s) 18 also tends to "pull" the sealing member 12 to angularly displace with the rotor 14, thereby acting to maintain the angular momentum of, and the centrifugal force on, the sealing member 12. Thus, the seal assembly 10 of the present invention prevents the oscillation of the sealing member 12 between the "contact" inner position $P_I$ and "non-contact" positions spaced outwardly from the inner position $P_I$ (i.e., the outer position $P_O$ and points between the two positions $P_I$, $P_O$) as described in the Background section of this disclosure, and provides a lag or "hysteresis" effect on the radial movement of the sealing member 12. That is, one desired effect of the lift passages 18 is to provide a lag or delay that prevents the sealing member 12 from "dropping" onto the rotor 14, thus substantially increasing friction and wear of the seal components, whenever the shaft speed falls below the hold-off speed, as described above.

Figure 4A:
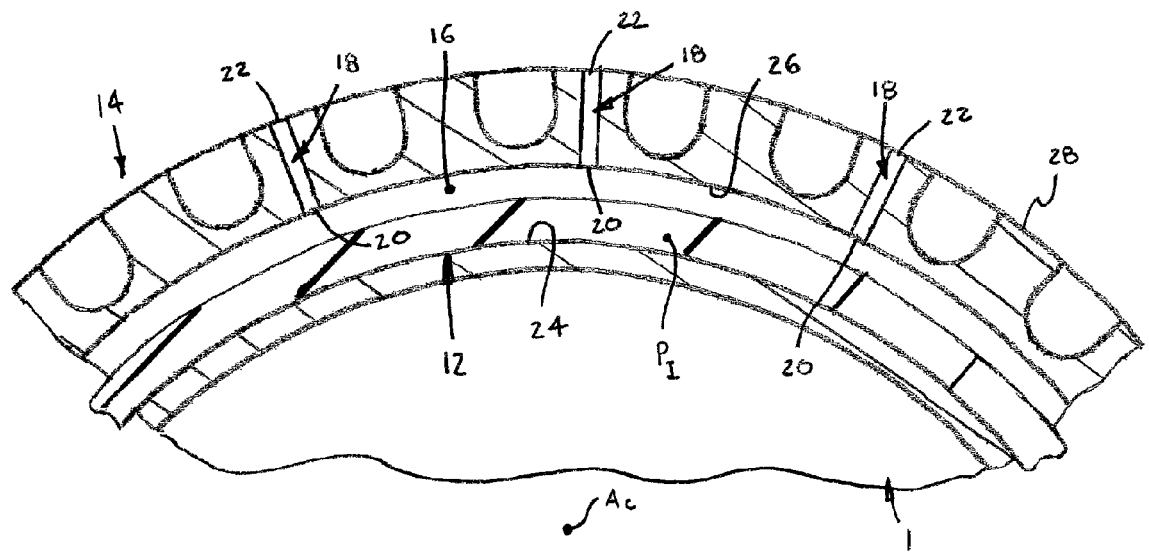
FIGS. 4A and 4B, collectively
Figure 4B:
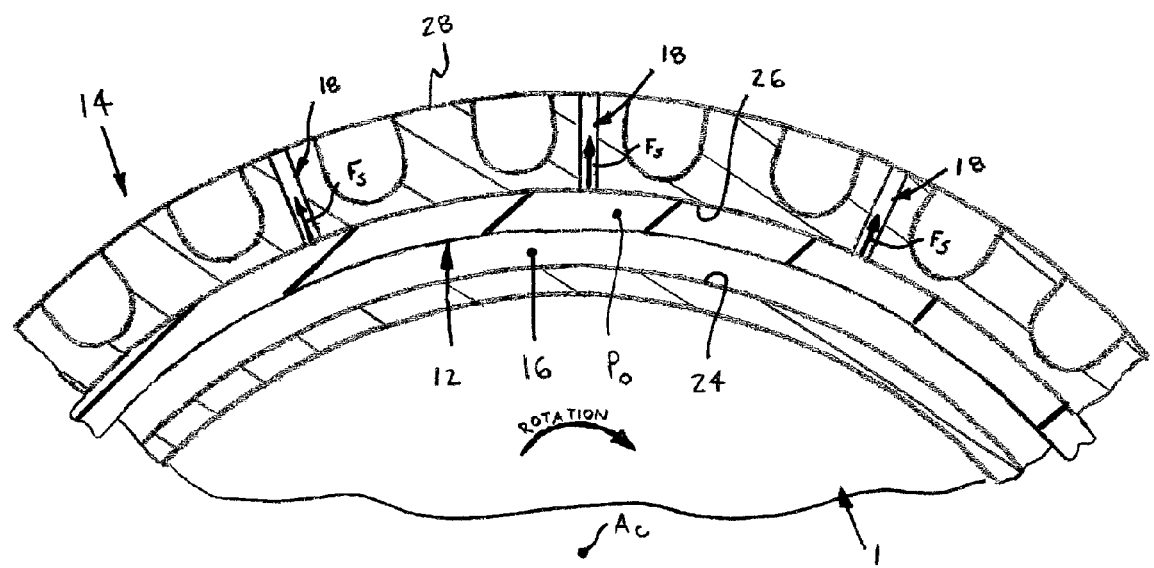

Further, as mentioned above, the rotor 14 preferably has a plurality of the lift passages 18, which are spaced circumferentially about the central axis $A_C$, and thus about the entire perimeter of the rotor 14. More specifically, the rotor cavity 16 is radially bounded by the outer circumferential surface 24 (described above) and an inner circumferential surface 26 spaced radially outwardly from the outer surface 24, and the plurality of lift passages 18 each have an inner port 20 extending radially outwardly from the inner surface 26. With this structure, the inner port 20 of each one of the lift passages 18 is located generally proximal to a separate section of the sealing member 12, such that suction $F_S$ from each rotating passage 18 is exerted on the proximal section of the sealing member 12, as best shown in FIG. 4B. Thus, the plurality of passages 18 exert suction $S_F$ about the entire circular perimeter of the sealing member 12, to ensure that all points on the sealing member 12 are retained at the outer position $P_O$ (i.e., as opposed to one or more sealing member sections remaining engaged with the rotor 14). Further, the sealing member 12 is preferably configured to substantially seal the inner port 20 of each lift passage 18 when the sealing member 12 is disposed generally at the outer position $P_O$, which prevents the passage of fluids or debris into the cavity(ies) 14 and the clearance space $S_C$.

That is, when located at the outer position $P_O$, the sealing member 12 is preferably disposed against the inner circumferential surface 26 of the rotor 14, so as to generally obstruct the ports 20 to prevent passage of fluids or solids from the cavity 16 and into the lift passage(s) 18, and vice-versa. Preferably, each lift passage 18 extends from the inner surface 26 to an outer circumferential surface 28 of the rotor 14 spaced outwardly from the inner surface 26, such that the outer port 22 extends through the outer circumferential surface 28. However, the lift passages 18 may alternatively extend to a generally radial surface (not indicated) of the rotor 14, as long as the outer port 22 is located radially outwardly from the inner port 20 for the reasons described above.

Referring again to FIGS. 1-5, the seal assembly 10 is preferably generally formed as a commercially available static and dynamic seal assembly commonly referred to an "expeller seal", such as for example, as disclosed in U.S. Pat. No. 7,484,734, the entire contents of which are incorporated by reference herein. Being formed as an expeller seal assembly, the seal assembly 10 has two sealing members 12, the rotor 14 has two cavities 16 each containing a separate one of the two sealing members 12, and the seal assembly 10 further comprises a stator 30. Although a detailed description of the specific expeller components is beyond the scope of the present disclosure, a brief description follows in order clarify the presently preferred embodiment of the present invention.

Figure 2:
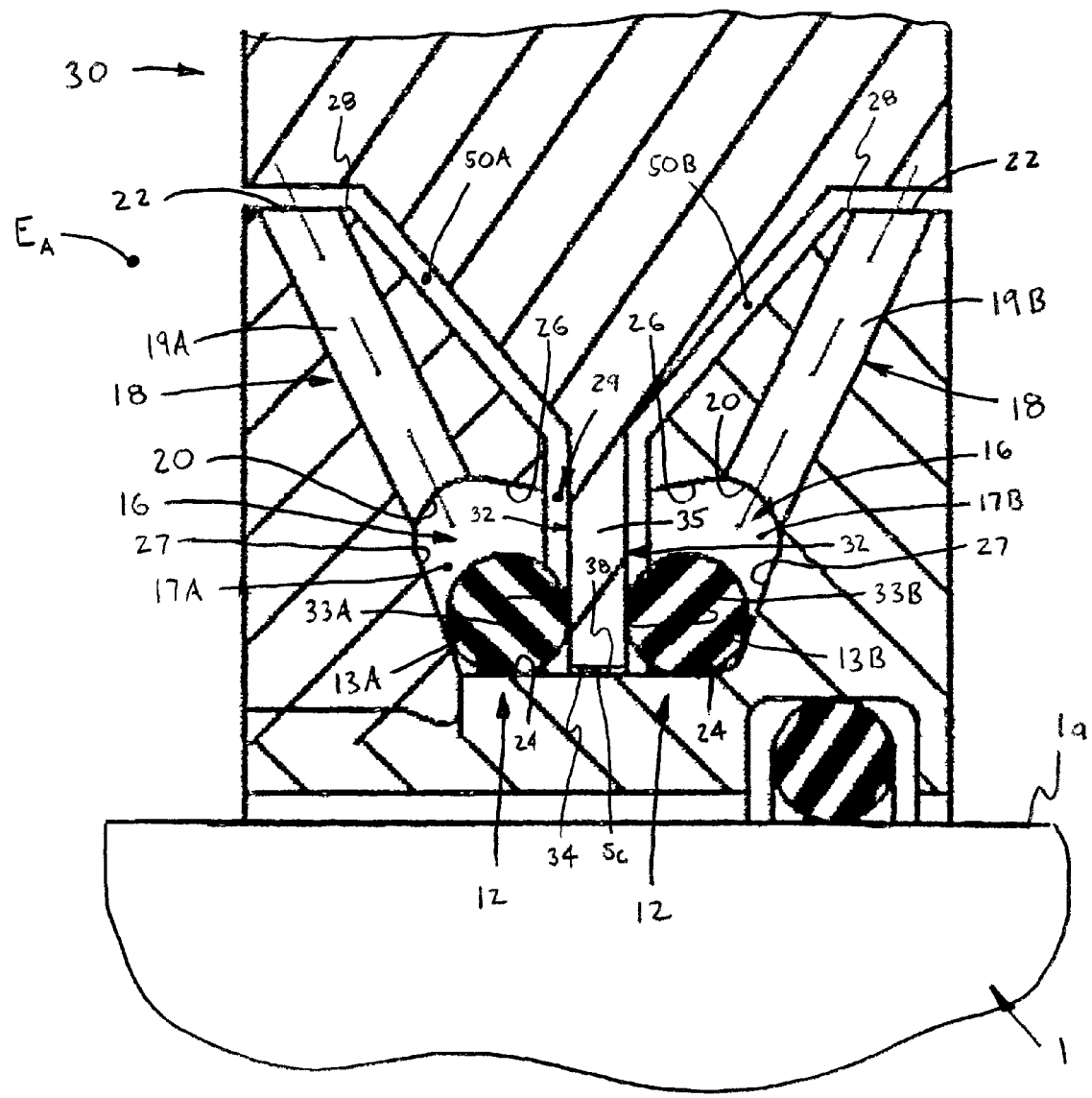
FIG. 2 is a partly broken away, enlarged axial cross-sectional view of the seal assembly.

Referring to FIGS. 1-3, the stator 30 is generally annular and has a central bore 31 sized to receive the shaft 1, such that the clearance space $S_C$ is defined generally between the shaft 1 and the stator 30. Preferably, the clearance space $S_C$ is more specifically bounded or defined directly between an inner circumferential surface 34 of the stator 30 and an outer circumferential surface 38 of the rotor 14, as indicated in FIG. 2, but may, in certain seal constructions, be alternatively defined between the stator inner surface 34 and the shaft outer surface 1a (structure not depicted). Further, the stator 30 has at least one seal seating surface 32, preferably opposing first and second radial seating surfaces 33A, 33B, the inner circumferential surface 34 extending generally axially between the two radial surfaces 33A, 33B and defining the central bore 31.

Figure 5:
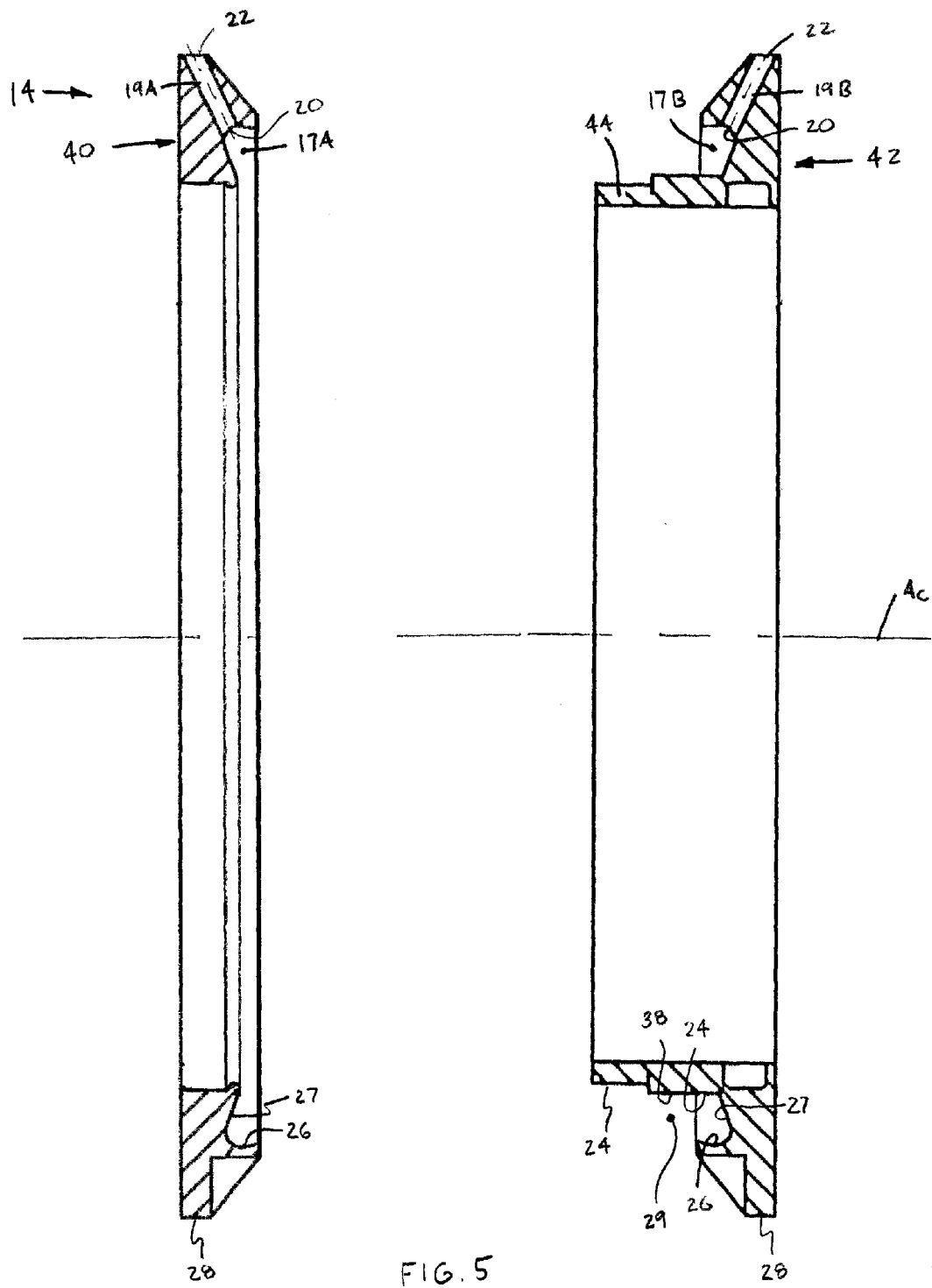
FIG. 5 is an exploded, axial cross-sectional view of a preferred two-piece structure of a rotor of the seal assembly.

As mentioned above, the rotor 14 preferably includes two cavities 16, a first cavity 17A and a second cavity 17B spaced axially from the first cavity 17A, each being configured to receive a separate one of the two sealing members 12. Each cavity 17A, 17B is defined generally by the inner and outer circumferential surfaces 24, 26 as described above, and also on an outer axial side by a generally radial surface 27 extending between the inner and outer surfaces 24, 26, the inner axial side of each cavity 17A, 17B being open. Also, the rotor 14 preferably has two sets of lift passages 18; a first set 19A of lift passages 18 extending at least partially radially outwardly from the first cavity 17A and a second set 19B of lift passages 18 extending at least partially radially outwardly from the second cavity 17B. Further, the rotor 14 also has a central opening 29 extending generally radially between the two cavities 17A, 17B and being configured to receive a radially inner portion 35 of the stator 30. As best shown in FIG. 5, the rotor 14 is preferably formed of two connected rotor portions 40, 42 each including one of the cavities 17A, 17B, respectively, and one lift passage set 19A, 19B, respectively. Further, one rotor portion 42 preferably includes a central tubular section 44 disposable about the shaft 1, so as to rotatably couple the rotor 14 therewith, and providing the outer circumferential surface 38 which partially bounds the clearance space $S_C$.

With this structure, the stator inner portion 35 is disposed within the rotor central opening 29 so as to be positioned between the first and second cavities 17A, 17B and defining first and second flow passages 50A, 50B. Each flow passage 50A, 50B fluidly couples the clearance space $S_C$ with the exterior atmosphere $E_A$, for reasons described below. Also, each of the two preferred sealing members 12 is disposed within a separate one of the cavities 17A, 17B and is sealingly engageable with the stator 30. Specifically, a first sealing member 13A is disposed in the first rotor cavity 17A and is engageable with the first radial seating surface 33A so as to seal one axial end of the clearance space $S_C$, and a second sealing member 13B is disposed in the second rotor cavity 17B and is engageable with the second radial seating surface 33B so as to seal the opposing axial end of the clearance space $S_C$. Thus, in a static state of the seal assembly 10, the two sealing members 13A, 13B are engaged with stator radial surfaces 33A, 33B and the associated rotor inner surfaces 24 so as to substantially seal the clearance space $S_C$, as shown in FIGS. 2, 3A and 4A.

When the seal assembly 10 starts to angularly displace due to rotation of the shaft 1, each sealing member 13A, 13B is initially pulled along with the rotor 14 until, at a certain rotational speed, centrifugal force on the sealing members 13A, 13B is sufficient to deflect the members 13A, 13B radially outwardly. Each sealing member 13A, 13B thereby disengages from the associated rotor outer surface 24 and seating surface 33A, 33B and then displaces from the inner position $P_I$ toward the outer position $P_O$, as shown in FIGS. 3B and 4B. As the sealing member 13A, 13B approaches the outer position $P_O$, suction $F_S$ from the two sets 19A, 19B of lift passages 18 biases or "pulls" each sealing member 13A, 13B radially outwardly against the associated rotor inner circumferential surface 26. Thereafter, the sealing members 13A, 13B angularly displace with the rotor 14 and shaft 1, while a pressure differential through the two flow passages 50A, 50B generated by rotation of the rotor 14 "dynamically" seals the clearance space $S_C$ to substantially prevent flow into (and thus through) the space $S_C$.

Although the seal assembly of the present invention is described in the preferred application of an expeller seal assembly with two sealing members 12, the seal assembly of the present invention may be constructed as any other type of seal assembly that includes one or more annular sealing members movable between static and dynamic sealing positions. For example, the basic structure of the seal assembly 10 may be incorporated into a molded lip seal or other seal geometries (none shown).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein and in the appended claims.

We claim:

1. A seal assembly for sealing an opening about a shaft, the shaft being rotatable about a central axis, the seal assembly comprising:
   a stator disposed about the shaft, having opposing radial surfaces and an inner circumferential surface at least partially defining the opening;
   first and second generally annular sealing members each disposed about the shaft so as to angularly displace about the axis as the shaft rotates, each sealing member being radially deflectable between an inner position at which the sealing member is disposed against a separate one of the stator radial surfaces, and a radially outer position; and
   a generally annular rotor disposed about and rotatably coupled with the shaft, the rotor having first and second generally annular cavities each sized to receive a separate one of the sealing members, a central opening sized to receive at least a portion of the stator, first and second flow passages each fluidly coupling the clearance space with the exterior atmosphere and at least two lift passages each extending at least partially radially through the rotor, a first one of the two lift passages being spaced generally axially from the first flow passage and a second one of the two lift passages being spaced generally axially from the second flow passage, each lift passage having an inner port fluidly coupled with a separate one of the first and second cavities and an outer port fluidly coupled with an exterior atmosphere such that suction generated within the lift passages when the rotor angularly displaces about the axis generally retains each of the first and second sealing members at the member outer position.

2. The seal assembly as recited in claim 1 wherein:
   a pressure differential between the inner and outer ports of the first one of the two lift passages arises when the rotor angularly displaces about the axis, the pressure differential generating suction on the first sealing member so as to retain the first member generally at the member outer position; and
   a pressure differential between the inner and outer ports of the second one of the two lift passages arises when the rotor angularly displaces about the axis, the pressure differential generating suction on the second sealing member so as to retain the second member generally at the member outer position.

3. The seal assembly as recited in claim 1 wherein:
   each one of the first and second sealing members is coupleable with the shaft such that the rotation of the shaft angularly displaces the sealing member about the central axis and is configured to deflect radially outwardly toward the outer position by centrifugal force when the sealing member displaces about the axis; and
   the suction generated by each one of the first and second lift passages generally retains each one of the first and second sealing members at about the member outer position when the shaft angularly displaces relative to the sealing member.

4. The seal assembly as recited in claim 3 wherein:
   the rotor has a first outer circumferential surface partially bounding the first cavity, the first sealing member being frictionally engageable with the rotor first outer circumferential surface when located at the inner position so as to couple the first sealing member with the shaft; and
   the rotor has a second outer circumferential surface partially bounding the second cavity, the second sealing member being frictionally engageable with the rotor second outer circumferential surface when located at the inner position so as to couple the second sealing member with the shaft.

5. The seal assembly as recited in claim 1 wherein the rotor has first and second sets of lift passages spaced circumferentially about the central axis, the inner port of each one of the first set of lift passages being disposed generally proximal to a separate section of the first sealing member such that suction generated by each passage is exerted on the proximal section of the first sealing member, and the inner port of each one of the second set of lift passages being disposed generally proximal to a separate section of the second sealing member such that suction generated by each passage is exerted on the proximal section of the second sealing member.

6. The seal assembly as recited in claim 1 wherein the first sealing member is configured to substantially seal the inlet port of the first one of the two lift passages when the first sealing member is disposed generally at the first member outer position and the second sealing member is configured to substantially seal the inlet port of the second one of the two lift passages when the second sealing member is disposed generally at the second member outer position.

7. The seal assembly as recited in claim 1 wherein:
   the rotor has a first inner circumferential surface at least partly bounding the first annular cavity, a first outer surface spaced radially outwardly from the first cavity inner surface, the inner port of the first one of the two lift passages extending through the rotor first inner surface and the outer port of the first lift passage extending through the rotor first outer surface; and
   the rotor has a second inner circumferential surface at least partly bounding the second annular cavity, a second outer surface spaced radially outwardly from the second cavity inner surface, the inner port of the second one of the two lift passages extending through the rotor second inner surface and the outer port of the second lift passage extending through the rotor second outer surface.

8. The seal assembly as recited in claim 7 wherein each one of the rotor first and second outer surfaces is one of a generally circumferential surface and a generally radial surface.

9. The seal assembly as recited in claim 1 wherein each one of the first and second sealing members is formed of an elastomeric material.

10. The seal assembly as recited in claim 1 further comprising a stator with a central bore sized to receive the shaft such that the clearance space is defined generally between the shaft and the stator, the stator having first and second seating surfaces, the first sealing member being disposed generally against the stator first seating surface when the first sealing member is located at the first member inner position and the second sealing member being disposed generally against the stator second seating surface when the second sealing member is located at the second member inner position.

* * * * *